US008244069B1

(12) United States Patent
Bourdev

(10) Patent No.: US 8,244,069 B1
(45) Date of Patent: *Aug. 14, 2012

(54) FACILITATING COMPUTER-ASSISTED TAGGING OF OBJECT INSTANCES IN DIGITAL IMAGES

(75) Inventor: Lubomir B. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,819

(22) Filed: Jan. 28, 2011

Related U.S. Application Data

(63) Continuation of application No. 12/535,426, filed on Aug. 4, 2009, now Pat. No. 7,889,946, which is a continuation of application No. 11/069,692, filed on Feb. 28, 2005, now Pat. No. 7,587,101.

(51) Int. Cl.
*G06K 9/36* (2006.01)
*G06K 9/54* (2006.01)

(52) U.S. Cl. ........................................ 382/291; 382/305

(58) Field of Classification Search .................. 382/107, 382/181, 205, 275, 291, 305, 309, 311, 312; 345/619
See application file for complete search history.

(56) References Cited

U.S. PATENT DOCUMENTS

| | | | |
|---|---|---|---|
| 4,864,501 A | 9/1989 | Kucera et al. | |
| 4,975,969 A | 12/1990 | Tal | |
| 5,101,200 A | 3/1992 | Swett | |
| 5,164,992 A | 11/1992 | Turk et al. | |
| 5,414,781 A | 5/1995 | Spitz et al. | |
| 5,450,504 A | 9/1995 | Cailia | |
| 5,642,431 A | 6/1997 | Poggio et al. | |
| 5,864,848 A | 1/1999 | Horvitz et al. | |
| 5,982,916 A | 11/1999 | Kuhn | |
| 6,697,103 B1 | 2/2004 | Fernandez et al. | |
| 6,864,917 B2 | 3/2005 | Malloy Desormeaux | |
| 6,982,747 B2 * | 1/2006 | Yamagishi | 348/211.1 |
| 7,058,695 B2 * | 6/2006 | Takagi et al. | 709/217 |
| 7,214,065 B2 | 5/2007 | Fitzsimmons, Jr. | |
| 7,274,832 B2 | 9/2007 | Nicponski | |
| 7,293,172 B2 * | 11/2007 | Nishimura et al. | 713/161 |
| 7,444,330 B2 | 10/2008 | Bernstein et al. | |
| 2006/0187305 A1 | 8/2006 | Trivedi et al. | |

OTHER PUBLICATIONS

Suh, B., Bederson: Publication entitled: "Semi-Automatic Image Annotation Using Event and Torso Identification," Tech Report HCIL-2004-15, Computer Science Department, University of Maryland, College Park, MD., 2004.
P. Viola and M. Jones, "Robust Real-Time Object Detection," ICCV, Vancouver, CA, 2001.
F. Crow, "Summed Area Tables for Texture mapping," SIGGRAPH, 1984.

(Continued)

*Primary Examiner* — Kanjibhai Patel
(74) *Attorney, Agent, or Firm* — Robert C. Kowert; Meyertons, Hood, Kivlin, Kowert & Goetzel, P.C.

(57) ABSTRACT

One embodiment of the present invention provides a system that facilitates computer-assisted tagging of objects in a digital image. During operation, the system receives locations for one or more objects-of-interest in the digital image. Next, the system determines likelihoods of specific tags being assigned to the objects-of-interest. The system then automatically assigns tentative tags to the objects-of-interest based on the determined likelihoods. Next, the system displays the assignments of tentative tags to a user, and receives corrections to the assignments, if any, from the user.

20 Claims, 3 Drawing Sheets

OTHER PUBLICATIONS

H. Rowley, S. Baluja and T. Kanade, "Neural Network-Based Face Detection," In IEEE Pattern Analysis and Machine Intelligence, vol. 20, 1998.

H. Schneiderman, "A Statistical Approach to 3D Object Detection Applies to Faces and Cars," Ph.D Thesis, CMU, May 2000.

R. Feraud, O. Bernier, J. Viallet, M. Collobert, "A Fast and Accurate Face Detector Based on Neural Networks," IEEE Transactions on Pattern and Analysis and Machine Intelligence, vol. 23, Jan. 2001.

B. Heisele, et al., "Hierarchical Classification and Feature Reduction for Fast Face Detection with Support Vector Machines," Pattern Recognition 36, 2003.

B. Scassellati, "Eye Finding via Face Detection for a Foveated, Active Vision System," Proceedings of 15th National Conference of Artificial Intelligence, 1998.

A. Resenfield, et al, "Coarse-Fine Template Matching," IEEE Trans. Syst. Man Cybernet, 2, 1997.

J. Edwards, et al., "Appearance Matching of Occluded Objects Using Coarse-to-File Adaptive Masks," CVPR, 1997.

H. Schneiderman, et al., "Object Detection Using the Statistics of Parts," International Journal of Computer Vision, 2002.

Z. Sun, et al., "Quantized Wavelet Features and Support Vector Machines for On-Road Vehicle Detection," Seventh International Conference on Control, Automation, Robotics and Vision, 2002.

M. Yang, et al., "Detecting Faces in Images: A Survey," IEEE Transactions on Pattern Analysis and Machine Intelligence, vol. 24, 2002.

H. Sahbi, et al., Course-to-Fine Support Vector Classifiers for Face Detection, ICPR 2002.

Lubomir, et al., Adobe Systems, "Improving the speed of Object Detection in Images by Calibrating the Scanning Function," 7 pages, Oct. 21, 2008.

U.S. Appl. No. 11/069,692, filed Feb. 28, 2005.

U.S. Appl. No. 10/997,448, filed Nov. 24, 2004.

* cited by examiner

FACILITATING COMPUTER-ASSISTED TAGGING OF OBJECT INSTANCES IN DIGITAL IMAGES

This application is a continuation of U.S. application patent Ser. No. 12/535,426, filed Aug. 4, 2009 (U.S. Pat. No. 7,889,946), which is a continuation of U.S. application patent Ser. No. 11/069,692, filed Feb. 28, 2005 (U.S. Pat. No. 7,587,101).

BACKGROUND

1. Field of the Invention

The present invention relates to techniques for tagging images within computer systems. More specifically, the present invention relates to a method and an apparatus that facilitates computer-assisted tagging of object instances within digital images.

2. Related Art

Unlike conventional film-based photographs, digital photographs can be loaded onto a computer system. This allows photographic management software to be used to organize, access and manipulate the photographs. In managing a collection of digital photographs, it is quite useful to assign tags to the photographs, to facilitate subsequent operations involving the photographs. For example, photographs can be tagged with the names of people that appear in the photographs to facilitate subsequent retrieval of photographs containing a specific person.

Unfortunately, in existing systems, users have to tag digital photographs manually. This involves going through the photographs one-at-a-time to explicitly assign tags to photographs. For example, the tags can identify the people present in the photograph or the location of the photograph. Note that tagging people in photographs is especially problematic because there are often multiple people in a given photograph. Consequently, there may be multiple tags for each photograph. This differs from location tags, wherein only a single location is typically associated with a given photograph.

Because the tag-assignment process is so time-consuming, very few people actually take the time to do it, even though tagging significantly enhances photograph management operations, such as searching.

Hence, what is needed is a method and an apparatus that facilitates tagging photographs without having to perform time-consuming manual tagging operations.

SUMMARY

One embodiment of the present invention provides a system that facilitates computer-assisted tagging of objects in a digital image. During operation, the system receives locations for one or more objects-of-interest in the digital image. Next, the system automatically determines likelihoods of specific tags being assigned to the objects-of-interest. The system then automatically assigns tentative tags to the objects-of-interest based on the determined likelihoods. Next, the system displays the assignments of tentative tags to a user, and receives corrections to the assignments, if any, from the user.

Hence, the present invention facilitates assigning tags to images, without the user having to manually assign tags to images. The user can simply confirm or correct an automatically generated tag assignment, which takes significantly less time than manually assigning tags to photographs. The present invention also streamlines the tagging process because images not containing objects-of-interest can be skipped, and only objects-of-interest can be presented to the user, instead of entire images.

In a variation on this embodiment, the digital image includes a set of related digital images, such as images from the same photo album or from the same event.

In a variation on this embodiment, the digital image comprises a portion of a video image sequence.

In a variation on this embodiment, receiving the locations for the one or more objects-of-interest involves: receiving the digital image; and performing an object detection operation on the digital image to detect the objects-of-interest and to determine the locations of the objects-of-interest.

In a variation on this embodiment, automatically assigning the tentative tags to the objects involves assigning the tentative tags based on: information about similar assignments from related digital images; time stamps associated with the digital image and with related digital images; information about the similarity of areas in proximity to the objects in related digital images; and/or probabilities that associated objects will appear together within the digital image.

In a variation on this embodiment, automatically assigning the tentative tags to the objects involves using information about the orientation, position and scale of a given object within the digital image to determine a probability that the given object will be tagged.

In a variation on this embodiment, displaying the assignments of the tentative tags to the objects can involve: displaying the tentative tags in proximity to the associated objects in the digital image; displaying the objects grouped by tentative tag assignments; and/or displaying a set of most likely tentative tags for each object.

In a variation on this embodiment, in addition to automatically assigning tentative tags to objects, the method further comprises allowing the user to manually assign tags to objects.

In a variation on this embodiment, the objects-of-interest can include: a face of a person; a head of a person; or a body of a person.

In a variation on this embodiment, the system ceases to display objects which have been tagged (or have had tag assignments confirmed) by the user.

In a variation on this embodiment, the system uses the assigned tags to facilitate subsequent operations involving the digital image and/or a set of related digital images.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

System that Assigns Tags to Images

Figure 1:
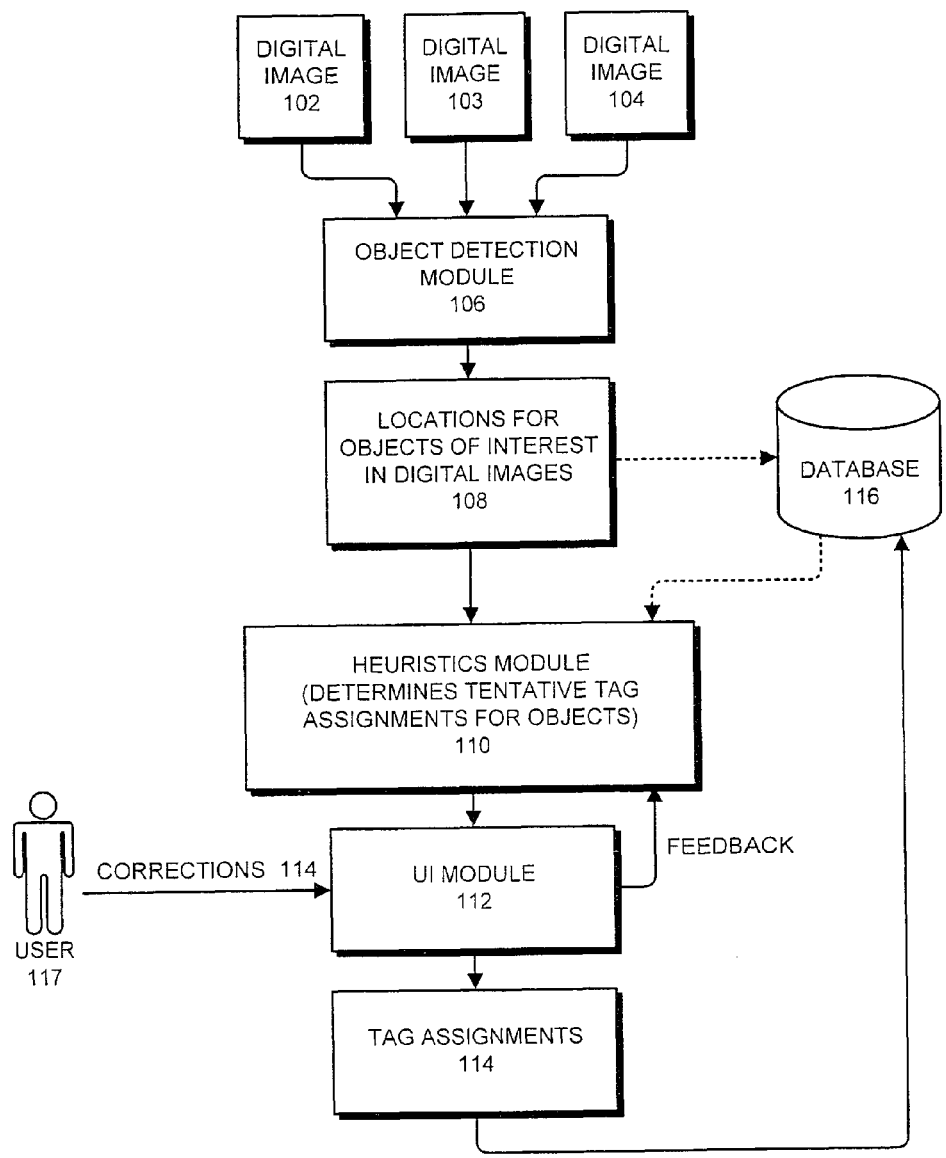
FIG. 1 illustrates a system that assigns tags to objects in accordance with an embodiment of the present invention.

FIG. 1 illustrates a system that assigns tags to objects in accordance with an embodiment of the present invention. (Note that the term "tag" refers to any type of identifier or other label which can be associated with an object within an image) This system resides within a computer system (not shown), which can generally include any type of computer single-processor or multiprocessor computer system, such as a stand-alone computer system or a distributed computer system.

The system processes a number of digital images 102-104 through an object detection module 106, which identifies the locations of objects-of-interest, such as faces, in digital images 102-104. At this point, the identified locations can be stored in database 116 as is indicated by the dashed lines in FIG. 1.

Next, a heuristics module 110 determines tentative tag assignments 10 for the identified objects. These tentative tag assignments feed into a user interface (UI) module, which presents the tentative tag assignments to a user 117. This enables user 117 to either confirm or correct the tentative tag assignments. Note that these corrections can possibly feed back into heuristics module 110 to update tag assignments for related object instances within digital images 102-104.

Finally, the confirmed tag assignments 114 can be stored in database 116. This enables the tag assignments to be used to facilitate subsequent operations involving the digital image or related digital images.

The process of assigning tags to images is described in more detail below with reference to FIGS. 2-3.

Object Record Structure

Figure 2:
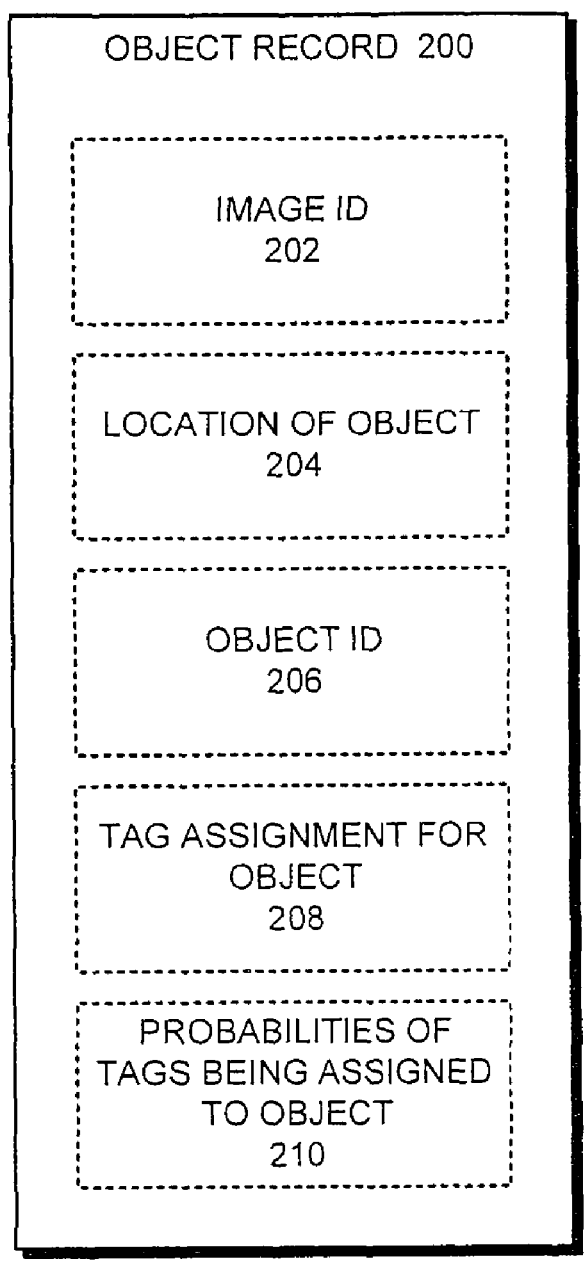
FIG. 2 illustrates an object record structure in accordance with an embodiment of the present invention.

One embodiment of the present invention uses an object record structure 200 (as is illustrated in FIG. 2) to represent object instances. One of these object record structures can be created for each instance of an object which 25 is located in a digital image. Referring to FIG. 2, object record structure 200 contains an image identifier 202, which identifies the image containing the object. Object record structure 200 also includes the location 204 of the object (within the image) as well as an object ID 206 for the object (or object instance). Object record structure 200 also includes a tag assignment 208 for the object, which is initially empty. Object record structure additionally contains probabilities of various tags being assigned to the associated object 210. These probabilities can 5 be determined using heuristics as is described below with reference to FIG. 3.

Process of Assigning Tags to Digital Images

Figure 3:
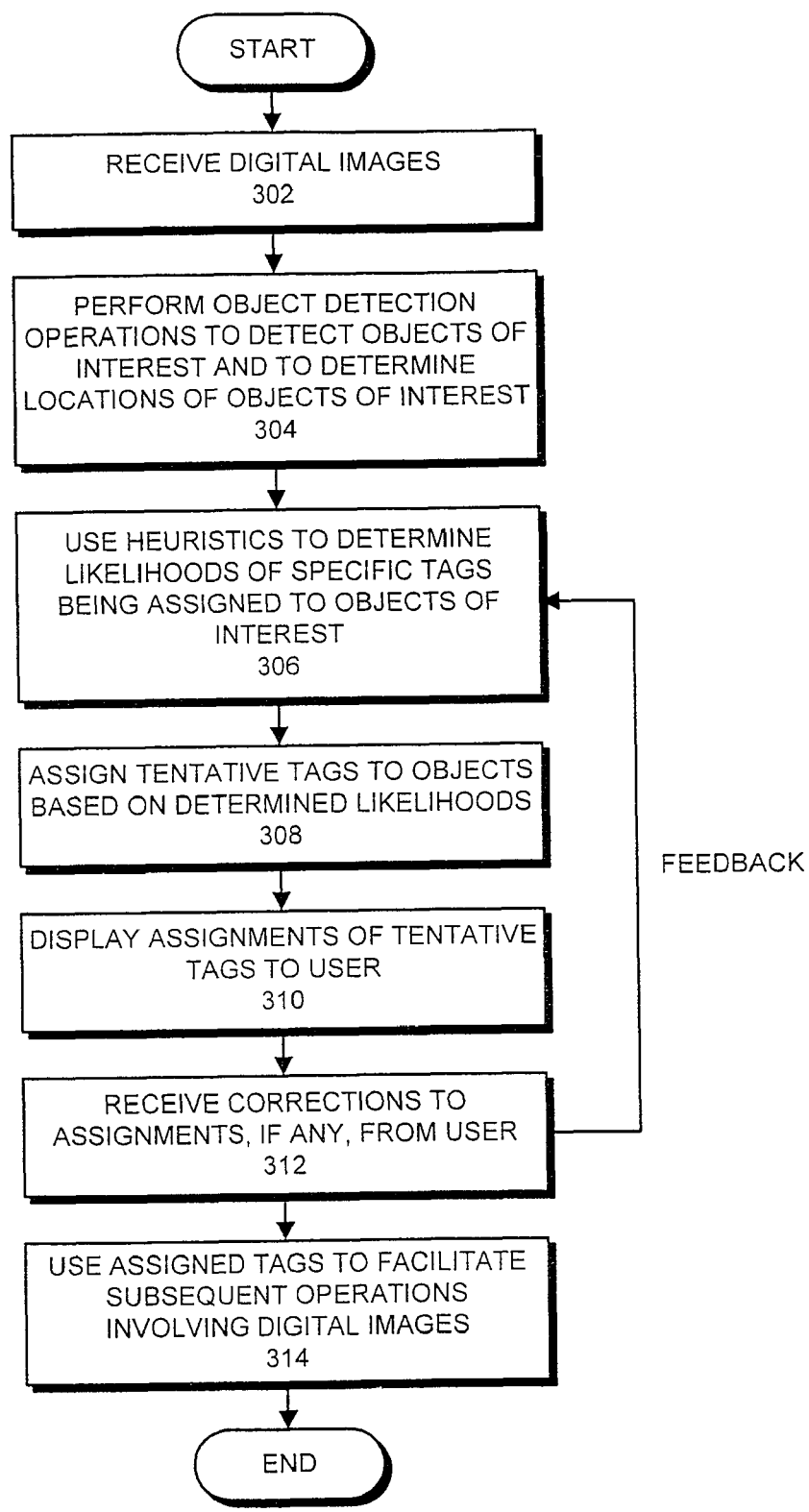
FIG. 3 presents a flow chart illustrating the process of assigning tags to digital images in accordance with an embodiment of the present invention.

FIG. 3 presents a flow chart illustrating the process of assigning tags to digital images in accordance with an embodiment of the present invention. The process starts when the system receives one or more digital images (step 302). These digital images can include digital photographs, or digital images from a sequence of digital images, such as a portion of a video image sequence. Note that a digital image typically contains a number of sub-images of objects which appear in the image. For example, an image can contain a number of faces. Hence, the term "object" as used in this specification can refer to a sub-image of an object within an image.

Next, the system performs an object detection operation on the digital images (using known object detection techniques) to determine the locations for instances of objects-of-interest in the digital images (step 304). At 20 this point, the system may allow the user to explicitly assign tags to objects.

The system then uses heuristics to determine likelihoods of specific tags being assigned to identified object instances (step 306). For example, the system can use the following heuristics in cases where the objects-of-interest are faces of people within digital photographs.

(1) The system can determine tag assignments for untagged faces in photographs based on tag assignments from related photographs associated with the same user. For example, if the user has tagged a face as belonging to a specific person in a photograph, the system can consider the specific person while make tentative tag assignments for faces in related photographs.

(2) The system can use time stamps of photographs to assist in determining tag assignments. For example, photographs which are taken at about the same time are likely to contain the same people, (3) The system can make use of the similarity of areas immediately under faces in photographs to determine tag assignments for photographs taken close in time. This heuristic takes advantage of the fact that a given person is likely to be wearing the same clothing on the same day.

(4) The system can make use of the similarity of areas above faces in photographs taken close in time for tag assignments. This heuristic takes advantage of the fact that the same person is likely to have the same hair style, or is likely to be wearing the same hat, in photographs taken at about the same time.

(5) The system can make use of the pose and scale of faces to determine the probability that a given face will be tagged. If there are many faces in a photo, a small face or a non-frontal pose decreases the likelihood that the face will be tagged. Conversely, larger faces, frontal faces and faces that are closer to the center of a photograph are more likely to be tagged.

(6) The system can make use of information from other tag assignments in the same or similar photographs to determine tag assignments. Note that a given person is unlikely to occur in a photograph more than once. Moreover, a tag is likely re-occur in different photographs taken close in time to each other.

(7) The system can make use of the likelihood that the specific combinations of people are likely to occur together in photographs. For example, members of the same family are likely to occur together in the same photograph. Hence, if the user has tagged a face as belonging to a specific person in a photograph, the system can consider family members of the specific person when attempting to assign tags to other faces in the photograph or in other photographs.

Next, the system assigns tentative tags to objects based on the determined likelihoods (step 308). Note that the system may decide not to assign tags to certain objects. For example, in a crowd of people, the system may only assign tags to specific people-of-interest in the crowd.

Next, the system displays assignments of tentative tags to objects to a user (step 310). During this display process, the most-likely tags can be presented to the user for mass confirmation or correction. This can involve: displaying the tentative tags in proximity to the associated objects in the digital image; displaying the objects grouped by tentative tag assignments; and/or displaying a set of most likely tentative tags for each object (for example, in a 5 pull-down menu under each object-of-interest).

In one embodiment of the present invention, the objects-of-interest are "faces" in digital photographs. In this embodiment, a "face-tagging wizard" displays faces of people automatically extracted from images, normalized to the same size. These faces are grouped into bins for each tag assignment and may be ordered based on the system's confidence that the faces belong to the bin. There can also be an "unassigned" faces bin. The user can select one or more faces and drag them from one bin to another, thereby changing their assignments. Alternatively, the user can delete faces, thereby making them unassigned.

Sometimes it is difficult to recognize a sub-image for an object outside of its surrounding image. To help with this, the entire image from which the object instance was extracted can be displayed in a corner, possibly with the object highlighted. Objects explicitly tagged by the user can be removed to make space for new objects. In addition, the act of explicitly tagging an object may change the suggested assignments of related objects, so that untagged Objects may move from one bin to another.

After the tentative tag assignments are displayed to a user, the user can correct or confirm the assignments (step 312). At this point, the corrected (or confirmed) assignments can be stored to a database. The system can also return to step 306 to apply the heuristics to the corrected (or confirmed) assignments. In this way, as the user corrects tag assignments, the estimates for tag assignment likelihoods for untagged faces can be reevaluated. Hence, correcting a tag assignment may trigger changes to other tag assignments. The system can also remove from the display objects which have been tagged (or have had tag assignments confirmed) by the user.

Finally, the system can use the tag assignments to facilitate subsequent operations involving the digital images (step 314). For example, the system can retrieve all photographs that are tagged to indicate that a person-of-interest appears in the photographs.

One problem that can potentially arise is that recognition technology may not be good enough to present tag assignments to the user (a fraction of which are wrong). To deal with this problem, one embodiment of the present invention arranges the extracted images in such a way that images which the system believes are similar to each other are placed close to each other (or are somehow easier to select as a group). In this way, the user still has to explicitly select images to be associated with tags, but the user will have easier time selecting sets of images which are similar.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    performing, by one or more computers:
        receiving an indication of an object within an image;
        determining a likelihood of a specific tag being assigned to the object, wherein said determining comprises applying one or more heuristics to determine the likelihood of the specific tag being assigned to the object; and
        assigning the specific tag to the object based, at least in part, on the determined likelihood.

2. The method of claim 1, wherein assigning the tag to the object comprises associating the tag with the image.

3. The method of claim 1, further comprising:
    performing, by the one or more computers,
        displaying the assigned tag; and
        enabling user modification of the assigned tag.

4. The method of claim 1, wherein determining the likelihood comprises evaluating a similarity between an area of the image and a corresponding area of another image.

5. The method of claim 1, wherein determining the likelihood comprises receiving an indication of a second object within the image and of another instance of the second object within another image.

6. The method of claim 1, wherein determining the likelihood comprises comparing a time stamp of the image with a time stamp of another image.

7. The method of claim 1, wherein determining the likelihood comprises evaluating a probability that the object may occur more than once in a same image.

8. The method of claim 1, wherein determining the likelihood comprises evaluating a probability that a specific combination of objects may occur together in a same image.

9. The method of claim 1, wherein determining the likelihood comprises evaluating a position or a scale of the object within the image.

10. A non-transitory computer-readable storage device storing instructions that when executed by a computer cause the computer to perform a method for facilitating computer-assisted tagging of objects in a digital image, the method comprising:
    receiving an indication of an object within a first image;
    determining a likelihood of a specific tag being assigned to the object based, at least in part, upon a comparison between a characteristic of the first image and a corresponding characteristic of a second image; and
    assigning the specific tag to the object based, at least in part, on the determined likelihood.

11. The non-transitory computer-readable storage device of claim 10, wherein assigning the tag to the object comprises associating the tag with the first image.

12. The non-transitory computer-readable storage device of claim 10, the operations further comprising enabling user modification of the assigned tag.

13. The non-transitory computer-readable storage device of claim 10, wherein determining the likelihood comprises evaluating a similarity between an area neighboring the object within the first image and a corresponding area neighboring another instance of the object within the second image.

14. The non-transitory computer-readable storage device of claim 10, wherein determining the likelihood comprises comparing a time stamp of the first image with a time stamp of the second image.

15. The non-transitory computer-readable storage device of claim 10, wherein determining the likelihood comprises determining that the object is more prominently displayed than another object within the first image.

16. A system, comprising:

one or more processors; and memory storing program instructions executable by the one or more processors to perform operations comprising:

receiving an indication of an object within an image;

determining a likelihood of a tag being assigned to the object, wherein said determining comprises applying one or more heuristics to determine the likelihood of the tag being assigned to the object; and assigning the tag to the object based, at least in part, on the determined likelihood.

17. The system of claim 16, the operations further comprising enabling user modification of the assigned tag.

18. The system of claim 16, wherein determining the likelihood comprises comparing an area relative to the object within the image and a corresponding area relative to another instance of the object within another image.

19. The system of claim 16, wherein determining the likelihood comprises comparing a time stamp of the image with a time stamp of another image.

20. The system of claim 16, wherein determining the likelihood comprises determining that the object is more prominently displayed than another object within the image.

* * * * *